United States Patent [19]

Johnson

[11] Patent Number: 4,550,230
[45] Date of Patent: Oct. 29, 1985

[54] SPEAKER GRILLE WITH SNAP-IN FASTENER SYSTEM

[75] Inventor: William K. Johnson, Fort Collins, Colo.

[73] Assignee: International Jensen Incorporated, Schiller Park, Ill.

[21] Appl. No.: 435,085

[22] Filed: Oct. 18, 1982

[51] Int. Cl.⁴ .............................................. H04R 1/02
[52] U.S. Cl. .................................. 179/178; 179/146 R; 248/27.3; 292/80; 403/328; 403/381; 411/401
[58] Field of Search ............... 403/348, 349, 406, 329, 403/381; 292/80; 411/84, 85, 92, 95, 119, 120, 121, 401; 179/146 R, 146 E, 178; 381/86–90; 181/148, 150, 199; 455/350; 248/27.1, 27.3; 200/296; 361/331

[56] References Cited

U.S. PATENT DOCUMENTS

| | | | |
|---|---|---|---|
| 603,534 | 5/1898 | McCue | 411/119 |
| 911,846 | 2/1909 | Stuart | 403/329 |
| 1,432,349 | 10/1922 | McFarland | 411/119 |
| 4,281,224 | 7/1981 | Castagna | 179/146 R |
| 4,331,841 | 5/1982 | Castagna | 179/146 E |
| 4,359,133 | 11/1982 | Krolak | 181/148 |

FOREIGN PATENT DOCUMENTS 1236806 6/1960 France ............................ 403/381

Primary Examiner—Gene Z. Rubinson
Assistant Examiner—Danita R. Byrd
Attorney, Agent, or Firm—Willian Brinks Olds Hofer Gilson & Lione Ltd.

[57] ABSTRACT

A system for facilitating attachment of a loudspeaker grille to an adjacent structure. The invention includes a fastener with a square head which is shaped to be inserted within a head-receiving portion formed in the grille. The fastener is gripped on one pair of opposite sides between a pair of parallel, longitudinal guides. The other sides of the fastener are captured between an abutment and a depressable latch which is sufficiently flexible to permit insertion of the head thereover into the head-receiving portion.

12 Claims, 6 Drawing Figures

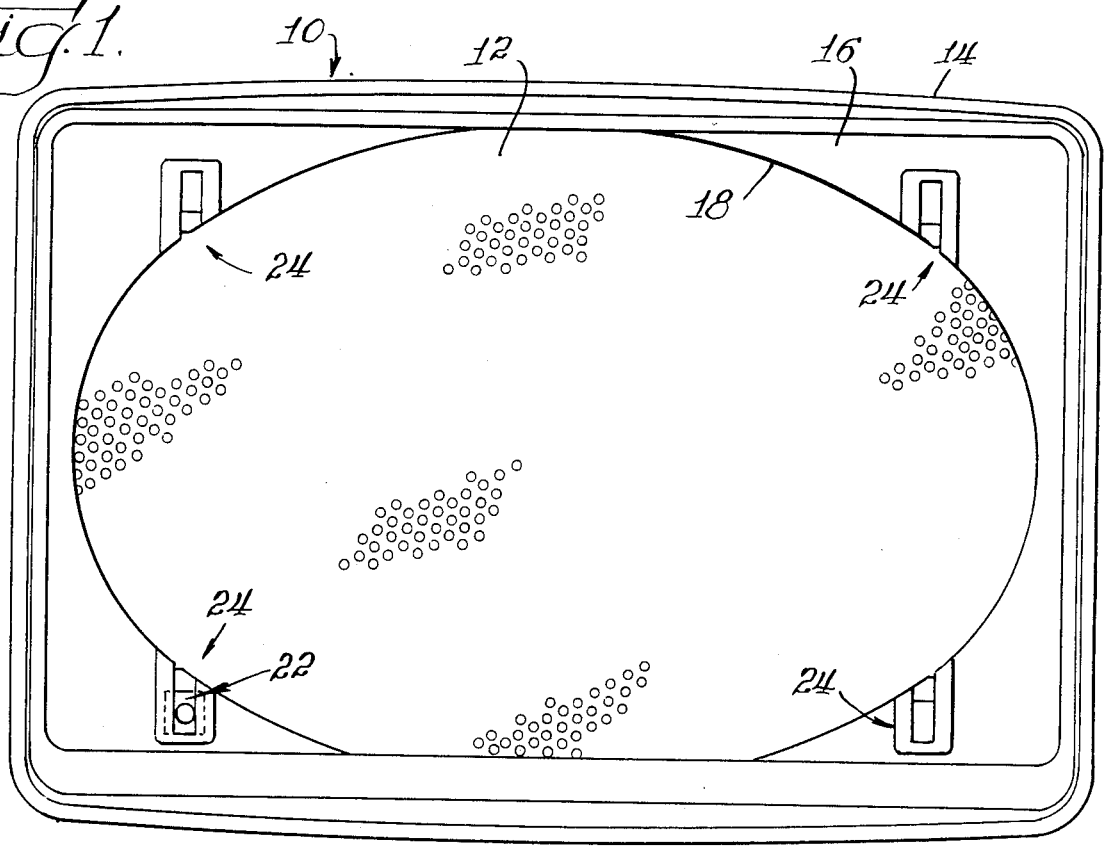
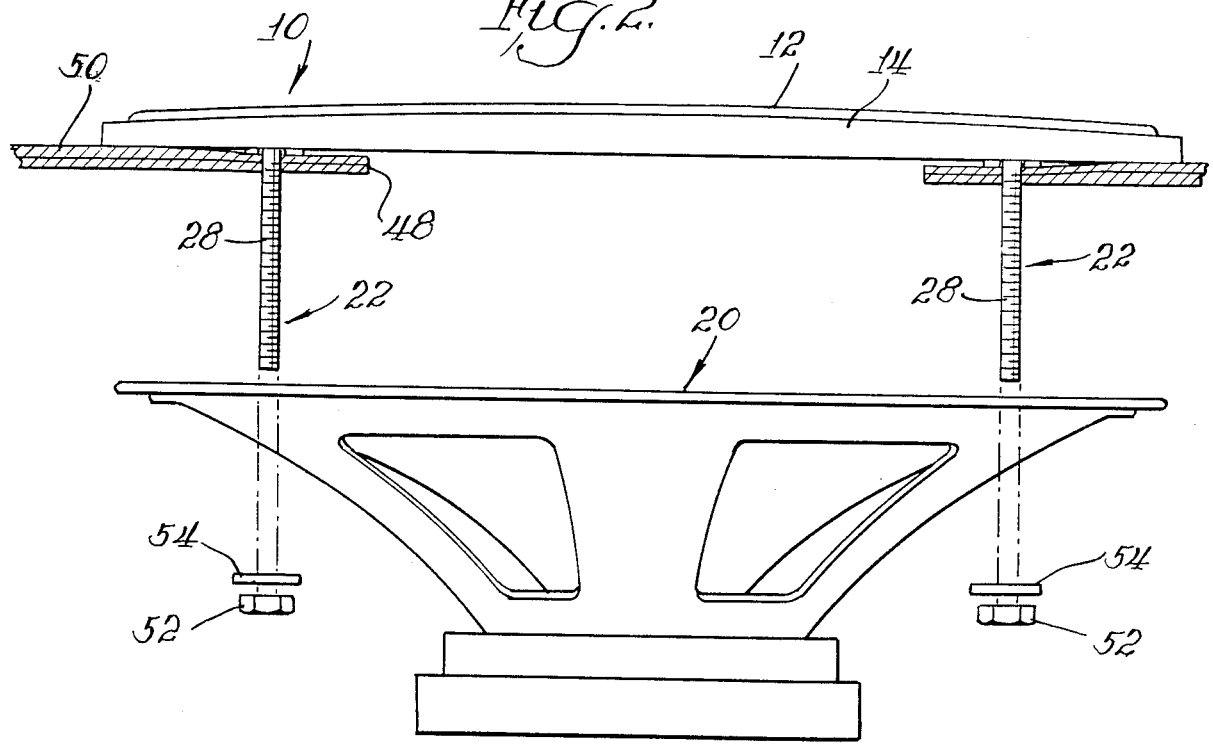

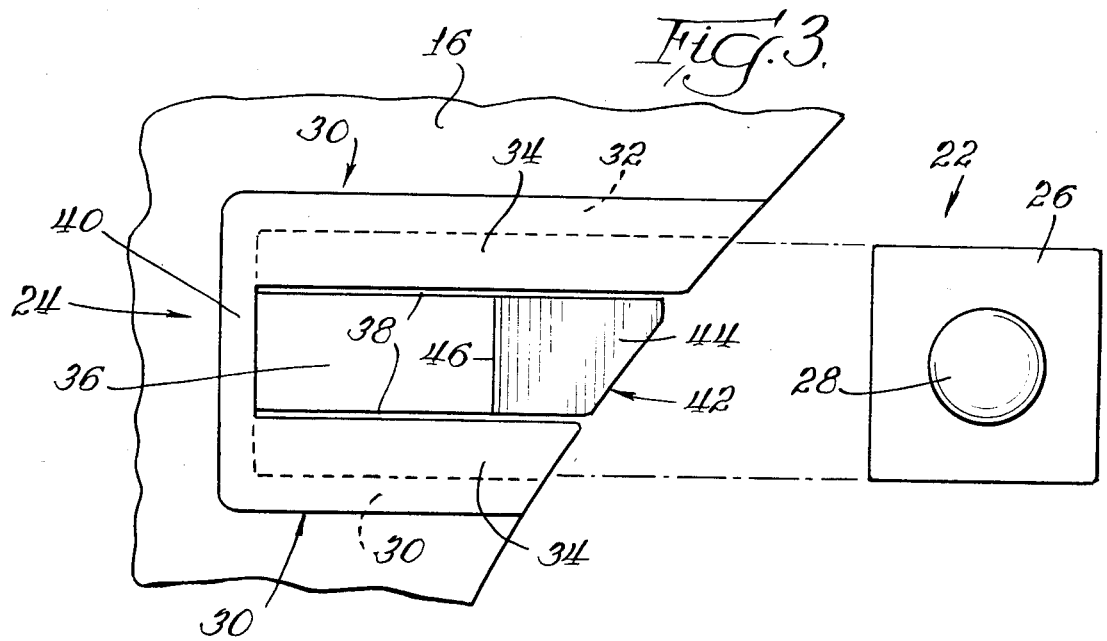
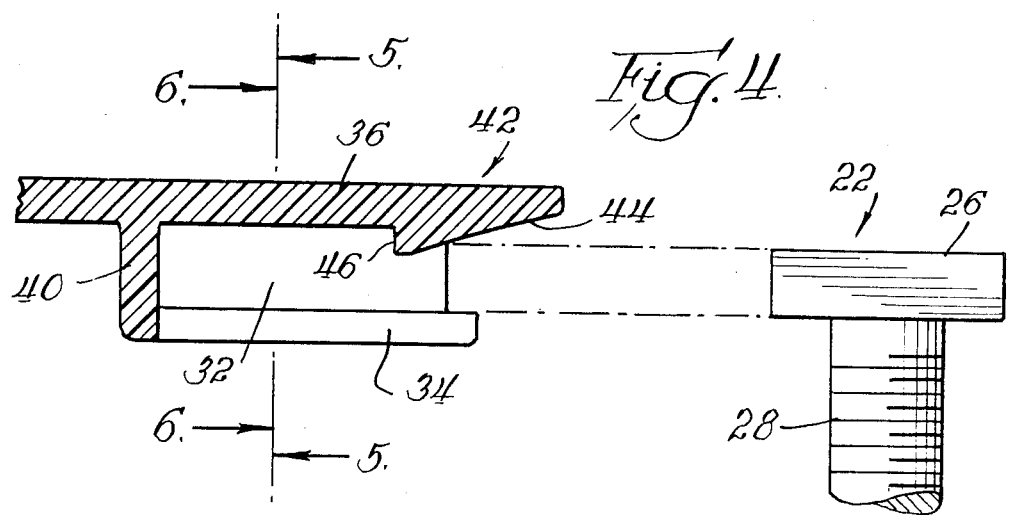
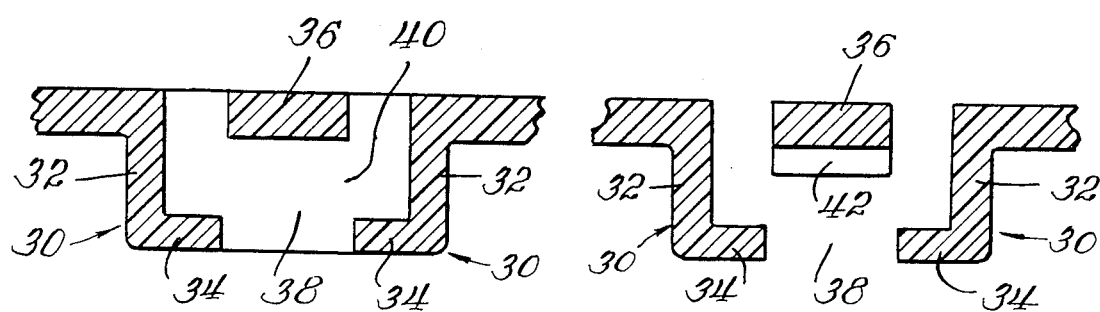

SPEAKER GRILLE WITH SNAP-IN FASTENER SYSTEM

BACKGROUND OF THE INVENTION

This invention relates to loudspeakers, and in particular to a system for attaching a loudspeaker grille to a loudspeaker or another adjacent structure.

Speaker grilles are often provided with a series of threaded fasteners which are attached to the grille in alignment with corresponding apertures formed in the speaker to which the grille is attached. Often, the fasteners are of sufficient length such that the fasteners are used to bolt the grille and loudspeaker to an adjacent structure. This is particularly true in automobiles where the loudspeaker-grille combination is to be installed in a cutout aperture in an automobile door or rear deck. In such an arrangement, the grille is at least as large as the speaker and includes two or more fasteners which extend through mating apertures in a flange about the rim of the speaker. The fasteners are then used to affix the speaker-grille assembly to supporting structure adjacent the aperture for the speaker.

There are a variety of ways in which the fasteners can be employed with the grille. For example, the grille can be provided with apertures completely through the grille and fasteners can be inserted through the apertures from the exterior of the grille. However, this is unsightly since the head of the fastener is then visible. The fasteners can also be attached to a baffle plate or similar structure affixed to the underside of the grille. The fasteners can be adhesively secured to the baffle plate, or inserted through holes in the baffle plate provided for holding the structure. In either case, the fasteners are permanently in place, prohibiting stacking of two or more grilles, substantially increasing the complexity of packaging for the grille, especially when sold in pairs in combination with a pair of loudspeakers.

SUMMARY OF THE INVENTON

The invention provides a system for attaching a loudspeaker grille to another structure. The fastener portion of the invention has a head with opposite, parallel sides and a shank extending from the head intermediate the sides. A head-receiving portion is located on the grille, and includes a nest shaped to accommodate the head. The nest has means for gripping the head and a head locking mechanism for retaining the head within the nest. The head locking mechanism includes an abutment transverse to the gripping means and a flexible latch spaced from the abutment, the abutment and the latch being separated at least the width of the head received therebetween. The head-receiving portion is open at the latch to permit insertion of the head beyond the latch into the nest.

In accordance with the preferred embodiment, the gripping means comprises two elements, a pair of parallel, longitudinal guides and a longitudinal bearing element. Each guide has a leg extending outwardly from the grille and a foot at the outer edge of the leg, with the two feet being oriented toward one another and the legs being spaced the width of the head received therebetween. The bearing element is situated between the legs and is spaced from the feet the depth of the head received therebetween. Thus, the head is oriented between the legs and is gripped between the hearing element and the inwardly-turned feet.

The latch comprises a depressible cam entry having a slope against which the head bears when inserted into the nest. The cam entry includes a stop shaped to inhibit removal of the head from the nest when snapped in place. Preferably, the latch is located on the bearing element.

In the disclosed embodiment, the bearing element comprises a tongue extending between the legs. The tongue is not connected to the legs in order to impart flexibility to the tongue to allow insertion of the fastener head over the cam entry.

The abutment comprises a closed end of each of the longitudinal guides. The feet of the guides are separated sufficiently to define a slot for passage of the shank of the fastener.

BRIEF DESCRIPTION OF THE DRAWINGS

The invention is described in greater detail in the following description of the preferred embodiment, taken in conjunction with the drawings, in which:

FIG. 1 is a plan view of the underside of a loudspeaker grille showing the attachment system according to the invention, FIG. 2 is a side elevational illustration of a loudspeaker grille having the attachment system according to the invention when located in alignment with a loudspeaker, FIG. 3 is a greatly enlarged view of the attachment system according to the invention, showing the path of insertion of the fastener head into the head-receiving portion on the loudspeaker grille, FIG. 4 is a side elevational illustration, in partial cross-section, of the system illustrated in FIG. 3, FIG. 5 is a cross-sectional illustration taken along lines 5—5 of FIG. 4, and FIG. 6 is a cross-sectional illustration taken along lines 6—6 of FIG. 4.

DESCRIPTION OF THE PREFERRED EMBODIMENT

A loudspeaker grille adapted to include the attachment system according to the invention is shown generally at 10 in the drawings. The grille 10 includes a grille "cloth" 12, often a perforated metal or plastic sheet which permits through-passage of sound, and a rigid border 14 to which the cloth 12 is attached. A baffle plate 16 typically of plastic, is also attached to the border 14 and includes an internal aperture 18 which is sufficiently large to avoid interference with sound emanating from a loudspeaker 20 associated with the grille 10.

The fastening system according to the invention comprises two components, a fastener 22 and a head-receiving portion 24 formed on the baffle plate 16. While four fasteners 2 and associated head-receiving portions 24 are envisioned in the embodiment of the invention illstrated in the drawings, it should be evident that any number of fasteners 22 and head-receiving portions 24 can be employed depending on the requirements demanded of the attaching system.

Each fastener 22 has a square head 26 and a threaded shank 28 extending integrally from the head 26. The opposite sides of the head 26 are parallel, and the head itself is flat so that it is readily captured within the head-receiving portion 24, as detailed below.

The head-receiving portion 24 has a nest which is shaped to accommodate the head 26 and securely hold the head 26 when snapped in place. For the purpose of gripping opposite sides of the head 26, the head-receiving portion 24 includes a pair of parallel, longitudinal guides 30 each having a leg 32 extending outwardly from the baffle plate 16 and a foot 34 at the outer edge of each leg 32, the feet 34 being oriented toward one another as shown. As best shown in FIG. 3, the legs 32 are spaced the width of the head 26 received therebetween. A longitudinal bearing element, in the form of a tongue 36, is situated between the legs 32. The tongue 36 is separated at least the depth of the head 26 from the feet 34, as best shown in FIG. 4. For resiliency, the tongue 36 is not attached to the legs 32 and is attached only at its distal end to the surrounding structure of the baffle plate 16.

The feet 34 extend toward one another as much as possible in order to engage as much of the head 26 as feasible. However, in order to permit passage of the shank 28 between the feet 34, the feet are spaced sufficiently to form a slot 38, as best shown in FIGS. 5 and 6.

The head-receiving portion 24 also includes a head locking mechanism for retaining the head 22 securely in place. The head locking mechanism includes a transverse abutment 40 comprising a closed end of each of the longitudinal guides 30. A latch 42 is spaced from the abutment 40 sufficiently to permit accommodation of the head 26 therebetween. As best shown in FIGS. 3 and 4, the head-receiving portion 24 is open at the latch 42 to permit insertion of the head 26 past the latch into the nest created by the guides 30, tongue 36, abutment 40 and latch 42.

As shown most clearly in FIG. 4, the latch 42 comprises a cam having a slope 44 against with the head 26 bears when the head is inserted under the latch 42. The latch 42 also includes a stop 46 to inhibit removal of the head 26 when fully inserted within the head-receiving portion 24. Thus, the head 26 is received in a snap-in, snap-lock fashion.

The fasteners 22 are inserted within the head-receiving portions 24 through the opening between the tongue 36 and feet 34 at the latch 42. Sufficient force is applied against the camming slope 44 to bend the tongue 36 slightly and allow the insertion of the head 26. When the head 26 is fully seated within the head-receiving portion 24, the resiliency of the tongue 36, in combination with the stop 46 of the latch 42, locks the head 26 in place.

As shown in FIG. 2, the grille 10 typically is used as the means for fastening a loudspeaker 20 in place. After a properly-dimensioned opening 48 is cut in the automobile rear deck 50, four holes are drilled in the rear deck 50 in alignment with the fastener shanks 28. The grille 10 is then placed over the upper side of the rear deck 50 with the fastener shanks 28 extending therethrough. The loudspeaker 20 is then brought from the underside of the rear deck 50 and aligned with apertures in its circumferential flange (not illustrated) in registration with the fasteners 22. The speaker is then secured in place with nuts 52 and washers 54 which are installed on the shanks 28 and tightened to clamp the grille 10 and speaker 20 on opposite sides of the rear deck 50.

ACHIEVEMENTS

The invention provides a reliable and simple system for attaching fasteners in a snap-in fashion to the underside of the loudspeaker grille. Not only may the fasteners be omitted from the grille until installation of the grille is desired, the fasteners are securely held in place in proper alignment and cannot inadvertently be misaligned. The fasteners are hidden from view and therefore the overall appearance of the grille is aesthetically pleasing.

When inserted within the head-receiving portions 24, the fasteners 22 are securely locked in place. However, due to the resiliency of the material of the baffle plate 16 in which the head-receiving portions 24 are formed, the tongues 36 can be manually depressed and the fastener 22 removed if desired.

Various changes may be made to the invention without departing from the spirit thereof or scope of the following claims.

What is claimed is:

1. A loudspeaker grille mounting system comprising:
   a. a loudspeaker grille;
   b. a fastener which defines a head, a shank extending from said head, and at least one first surface; and
   c. a head-receiving portion of said grille, said head-receiving portion secured to said loudspeaker grille and including a nest shaped to accommodate said head, said nest shaped to engage said first surface of said fastener to prevent rotation of said head, said head receiving portion further comprising a locking mechanism for retaining said head within said nest, said locking mechanism comprising an abutment and a latch spaced from said abutment, said abutment and latch being separated at least the dimension of said head received therebetween, said head receiving portion having at least one opening to permit insertion by sliding said head between said latch and abutment, said latch, abutment and head cooperating to secure said head at a predetermined position with respect to said grille.

2. A system according to claim 1 in which said latch comprises a depressible cam entry having a slope against which said head bears when inserted into said nest.

3. A system according to claim 2 in which said latch comprises a stop shaped to inhibit removal of said head from said nest.

4. A system according to claim 1 in which said latch comprises:
   a. a resilient cam surface having a slope against which said head bears during insertion into said nest; and
   b. a stop surface against which said head bears during removal from said nest;
   c. said cam and stop surfaces cooperating with said head to require a greater force for removal of said head from said nest than for insertion of said head into said nest.

5. A loudspeaker grille mounting system comprising:
   a. a loudspeaker grille;
   b. a fastener which defines a head having at least one pair of opposite, parallel sides and a shank extending from said head intermediate said sides, and
   c. a head receiving portion on said grille, said head receiving portion comprising at least one pair of parallel, longitudinal guides, said pair of guides cooperating with said sides of said head to prevent rotation of said head, each guide having a leg extending outwardly from said grille and a foot at the outer edge of said leg, said feet being oriented toward one another and said legs being spaced the dimension of said head received therebetween, and
   d. a longitudinal bearing element between said legs, said bearing element and said feet being separated the depth of said head received therebetween.

6. A system according to claim 5 which said latch is located on said bearing element.

7. A system according to claim 5 in which said bearing element comprises a tongue extending between and unconnected to said legs.

8. A system according to claim 5 in which said abutment comprises a closed end of each said guide.

9. A system according to claim 5 in which said feet define therebetween a slot for passage of said shank.

10. A loudspeaker grille mounting system comprising:
   a. a loudspeaker grille;
   b. a fastener comprising a head having at least one pair of opposite, parallel sides and a shank extending from said head intermediate said sides;
   c. a head-receiving portion on said grille, said head-receiving portion comprising a pair of parallel, longitudinal guides, said guides cooperating with said sides of said head to prevent rotation of said head; and
   d. a locking mechanism, included in said head-receiving portion, for retaining said head within said nest, said locking mechanism comprising an abutment and a latch spaced from said abutment, said head-receiving portion having at least one opening to permit insertion by sliding of said head between said abutment and latch, said abutment and latch being separated by at least the dimension of said head received therebetween, said abutment, latch, guides and head cooperating to secure said head at a predetermined location with respect to said grille.

11. A system according to claim 10 in which said latch comprises a depressible cam entry comprising a slope against which said head bears during insertion into said nest.

12. A system according to claim 11 in which said latch comprises a stop shaped to inhibit removal of said head from said nest.

* * * * *